United States Patent [19]
Bruce

[11] Patent Number: 5,927,558
[45] Date of Patent: Jul. 27, 1999

[54] APPARATUS FOR DISPENSING GRANULAR MATERIAL

[76] Inventor: Floyd Bruce, 7845 Horn Lake Rd., Walls, Miss. 38680

[21] Appl. No.: 09/033,627

[22] Filed: Mar. 4, 1998

[51] Int. Cl.[6] ........................................................ B67D 5/06
[52] U.S. Cl. ...................... 222/185.1; 222/342; 222/368; 222/444; 222/460
[58] Field of Search ................................ 222/185.1, 342, 222/367, 368, 444, 460, 462

[56] References Cited

U.S. PATENT DOCUMENTS

| | | | |
|---|---|---|---|
| 1,851,044 | 3/1932 | Genovesi . | |
| 1,863,133 | 6/1932 | Ziedins . | |
| 2,047,184 | 7/1936 | Gray | 221/106 |
| 3,169,675 | 2/1965 | Gutzman et al. | 222/360 |
| 3,870,199 | 3/1975 | Dugger et al. | 222/368 |
| 4,268,205 | 5/1981 | Vacca et al. | 222/368 |
| 4,511,067 | 4/1985 | Martin et al. | 222/230 |
| 4,893,737 | 1/1990 | Borjesson | 222/360 |
| 5,244,019 | 9/1993 | Derby | 222/368 |

FOREIGN PATENT DOCUMENTS

| | | | |
|---|---|---|---|
| 750235 | 1/1967 | Canada | 222/368 |
| 497737 | 8/1992 | European Pat. Off. | 222/367 |

*Primary Examiner*—Joseph A. Kaufman
*Attorney, Agent, or Firm*—Walker, McKenzie & Walker, P.C.

[57] ABSTRACT

A granular material dispensing apparatus including an upper hopper to hold a quantity of granular material; the upper hopper having an upper face forming a upper funnel and having an upper hopper outlet to allow granular material to pass therethrough; a lower hopper having an upper face forming a lower funnel and having a lower hopper outlet to allow granular material to pass therethrough; a wiper plate positioned between the upper hopper and the lower hopper; the wiper plate having a wiper plate outlet to allow granular material to pass therethrough from the upper hopper outlet, and having a lower face surface with a planar portion surrounding the wiper plate outlet; and an impeller mounted beneath the wiper plate outlet and rotatably movable between a first position and a second position; the impeller including at least a spaced pair of fins forming a pocket therebetween to receive a quantity of granular material from the wiper plate outlet when the impeller is in the first position and to transfer the quantity of granular material to the lower hopper to be dispensed through the lower hopper outlet when the impeller is subsequently rotated to the second position; each of the fins having a flexible distal end to wipe against the planar portion of the lower face surface of the wiper plate when the impeller is rotated between the first and second positions.

7 Claims, 3 Drawing Sheets

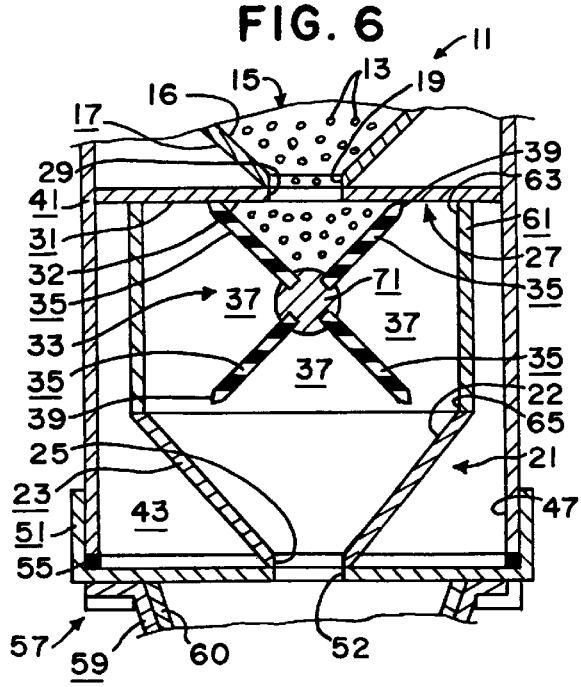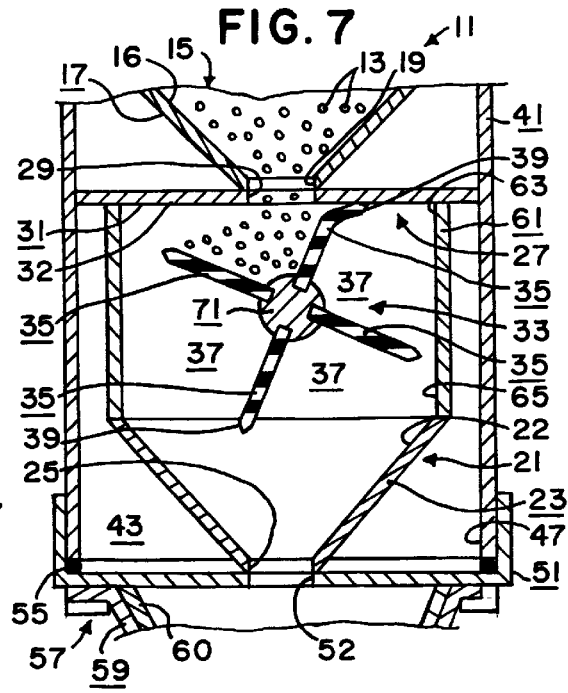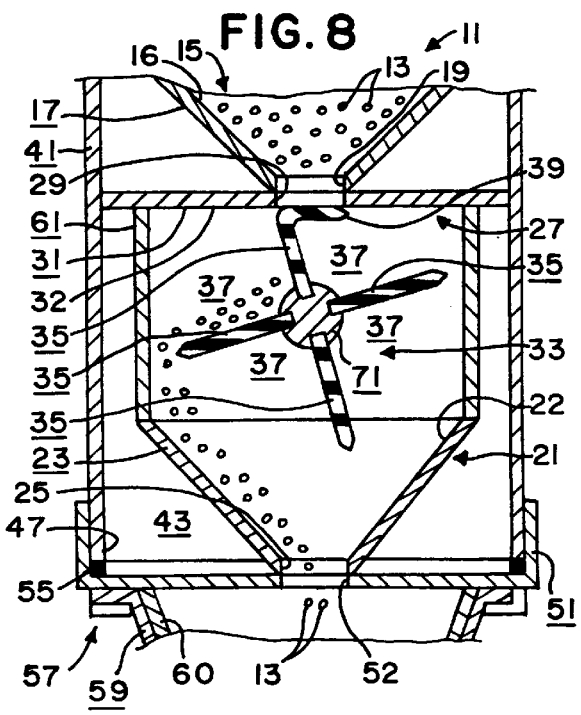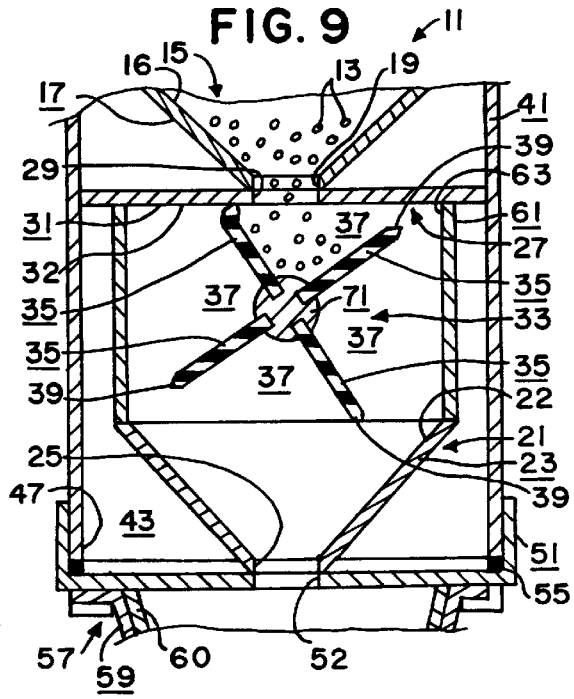

APPARATUS FOR DISPENSING GRANULAR MATERIAL

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to an apparatus for dispensing precise amounts of a granular material such as ground coffee beans.

2. Information Disclosure Statement

A preliminary patentability search conducted in class 222, subclass 360 produced the following patents which appear to be relevant to the present invention:

Genovesi, U.S. Pat. No. 1,851,044, issued Mar. 29, 1932, discloses a device for dispensing predetermined quantities of a powdered substance, such as sugar, salt, and the like, into suitable receptacles.

Ziedins, U.S. Pat. No. 1,863,133, issued Jun. 14, 1932, discloses an apparatus for measuring dry powder like substances.

Gray, U.S. Pat. No. 2,047,184, issued Jul. 14, 1936, discloses a device for delivering measured quantities of flour, grain, etc.

Gutzmann et al., U.S. Pat. No. 3,169,675, issued Feb. 16, 1965, discloses a metering dispensing device for granular material.

Martin et al., U.S. Pat. No. 4,511,067, issued Apr. 16, 1985, discloses a particulate material dispensing device.

Borjesson, U.S. Pat. No. 4,893,737, issued Jan. 16, 1990, discloses a dispenser for goods such as coffee.

Nothing in the known prior art discloses or suggests the present invention. More specifically, nothing in the known prior art discloses or suggests an apparatus for dispensing granular material that includes an upper hopper to hold a quantity of granular material; the upper hopper having an upper face forming a upper funnel and having an upper hopper outlet to allow granular material to pass therethrough; a lower hopper having an upper face forming a lower funnel and having a lower hopper outlet to allow granular material to pass therethrough; a wiper plate positioned between the upper hopper and the lower hopper; the wiper plate having a wiper plate outlet to allow granular material to pass therethrough from the upper hopper outlet, and having a lower face surface with a planar portion surrounding the wiper plate outlet; and an impeller mounted beneath the wiper plate outlet and rotatably movable between a first position and a second position; the impeller including at least a spaced pair of fins forming a pocket therebetween to receive a quantity of granular material from the wiper plate outlet when the impeller is in the first position and to transfer the quantity of granular material to the lower hopper to be dispensed through the lower hopper outlet when the impeller is subsequently rotated to the second position; each of the fins having a flexible distal end to wipe against the planar portion of the lower face surface of the wiper plate when the impeller is rotated between the first and second positions.

BRIEF SUMMARY OF THE INVENTION

The present invention provides an apparatus for holding a dispensing a measured quantity of granular material. A basic concept of the present invention is to provide an apparatus which holds a quantity of ground coffee, and which allows measured quantity of that ground coffee to be dispensed into a typical coffee filter basket or the like.

The apparatus of the present invention comprises, in general, an upper hopper to hold a quantity of granular material; the upper hopper having an upper face forming a upper funnel and having an upper hopper outlet to allow granular material to pass therethrough; a lower hopper having an upper face forming a lower funnel and having a lower hopper outlet to allow granular material to pass therethrough; a wiper plate positioned between the upper hopper and the lower hopper; the wiper plate having a wiper plate outlet to allow granular material to pass therethrough from the upper hopper outlet, and having a lower face surface with a planar portion surrounding the wiper plate outlet; and an impeller mounted beneath the wiper plate outlet and rotatably movable between a first position and a second position; the impeller including at least a spaced pair of fins forming a pocket therebetween to receive a quantity of granular material from the wiper plate outlet when the impeller is in the first position and to transfer the quantity of granular material to the lower hopper to be dispensed through the lower hopper outlet when the impeller is subsequently rotated to the second position; each of the fins having a flexible distal end to wipe against the planar portion of the lower face surface of the wiper plate when the impeller is rotated between the first and second positions.

BRIEF DESCRIPTION OF THE SEVERAL VIEWS OF THE DRAWINGS

FIG. 6 is a somewhat diagrammatic sectional view of a portion of the apparatus of the present invention, showing a first step in the operation thereof.

FIG. 7 is a somewhat diagrammatic sectional view of a portion of the apparatus of the present invention, similar to FIG. 6 but showing a second step in the operation thereof.

FIG. 8 is a somewhat diagrammatic sectional view of a portion of the apparatus of the present invention, similar to FIG. 6 but showing a third step in the operation thereof.

FIG. 9 is a somewhat diagrammatic sectional view of a portion of the apparatus of the present invention, similar to FIG. 6 but showing a fourth step in the operation thereof.

DETAILED DESCRIPTION OF THE INVENTION

Figure 1:
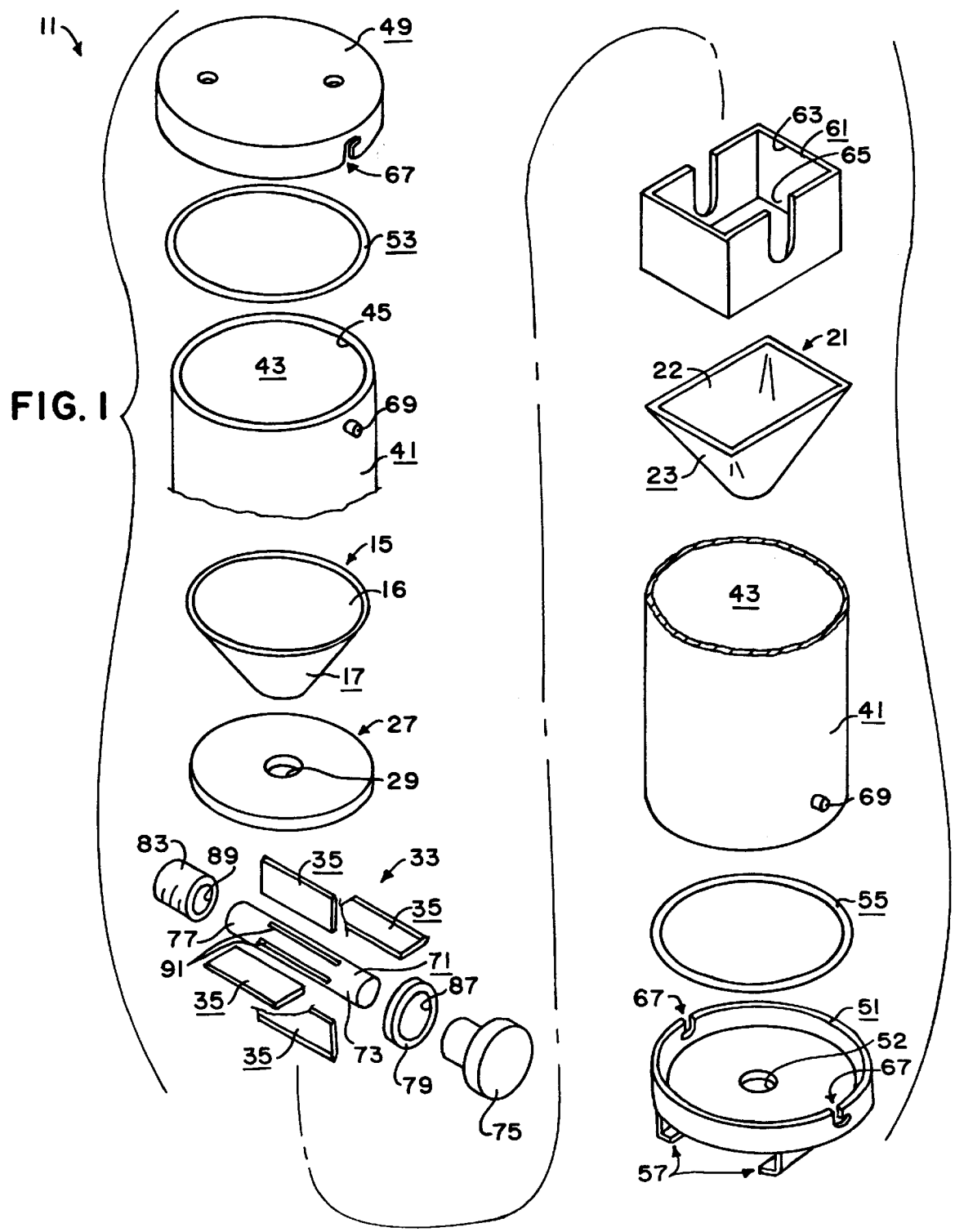
FIG. 1 is an exploded perspective view of the apparatus of the present invention, with portions thereof broken away for clarity.
Figure 2:
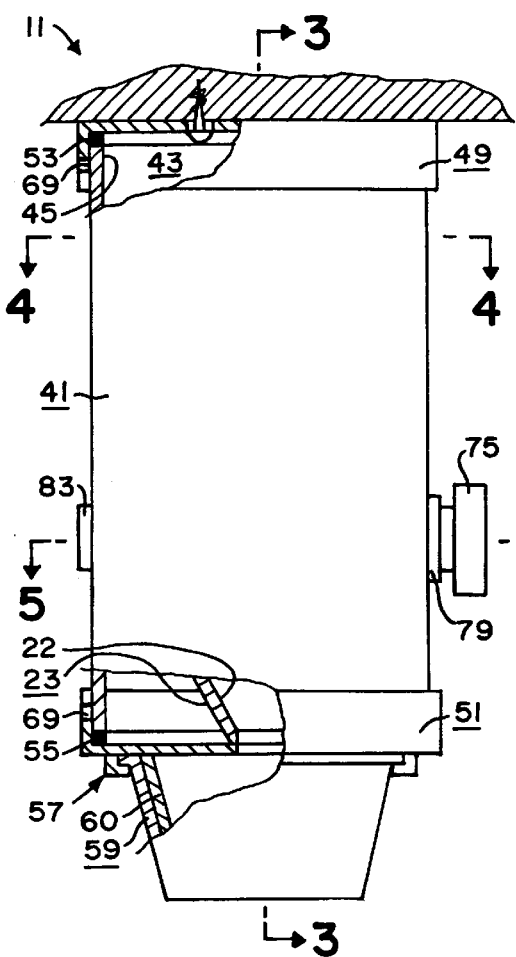
FIG. 2 is a front elevational view of the apparatus of the present invention, shown attached to the bottom of a cabinet or the like and with a drip-type coffee filter and coffee filter holder combined therewith.
Figure 3:
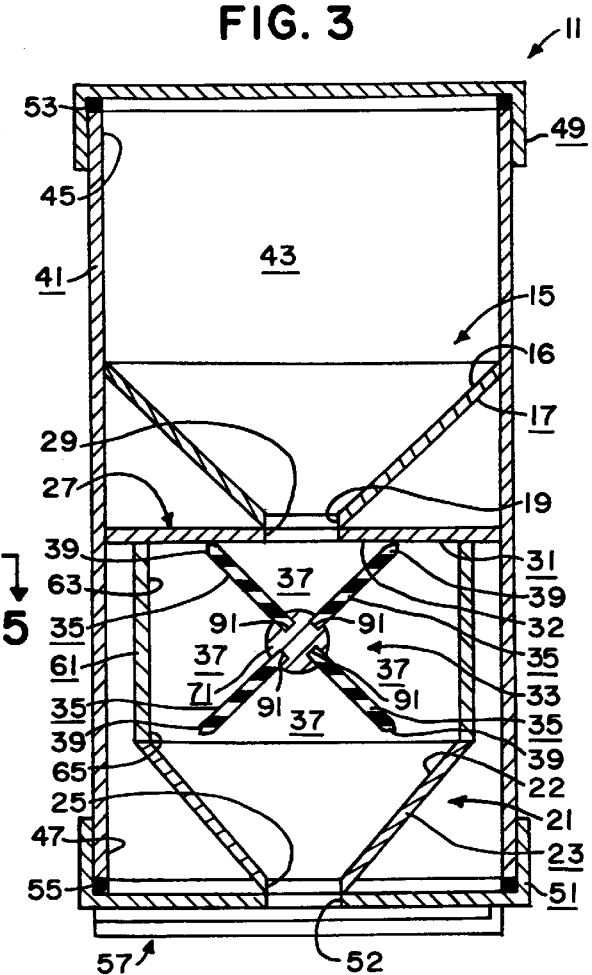
FIG. 3 is a sectional view substantially as taken on line 3—3 of FIG. 2 on a somewhat enlarged scale and with portions thereof omitted for clarity.
Figure 4:
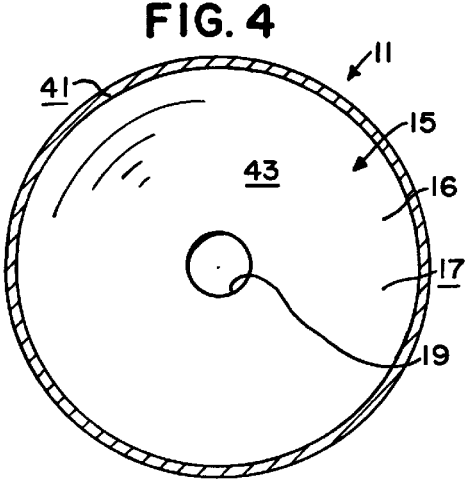
FIG. 4 is a sectional view substantially as taken on line 4—4 of FIG. 2 on a somewhat enlarged scale and with portions thereof omitted for clarity.
Figure 5:
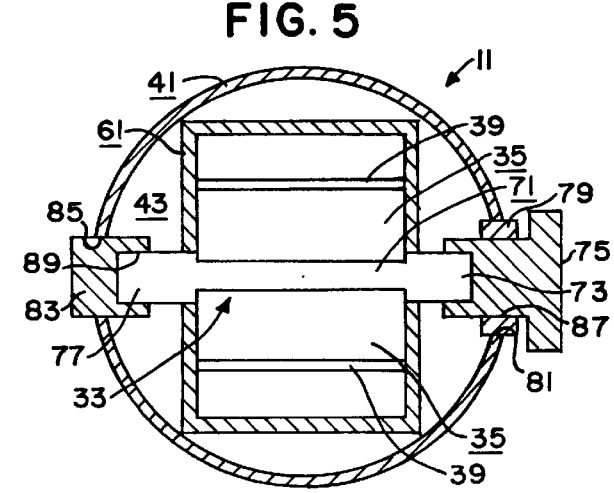
FIG. 5 is a sectional view substantially as taken on line 5—5 of FIG. 2 on a somewhat enlarged scale and with portions thereof omitted for clarity.

A first preferred embodiment of the apparatus of the present invention is shown in FIGS. 1–9, and identified by the numeral 11. The apparatus 11 is especially designed to hold and dispense granular material 13, such as ground or instant coffee or the like.

The apparatus 11 includes an upper hopper 15 to hold a quantity of the granular material 13. The upper hopper 15 has an upper face 16 that forms a upper funnel 17 and has an aperture or the like forming an upper hopper outlet 19 to allow granular material 13 to pass therethrough. The upper hopper outlet 19 is preferably located at the lowest point of the upper funnel 17 so that gravity will cause granular material 13 to pass therethrough from the upper hopper 15.

The apparatus 11 includes a lower hopper 21 having an upper face 22 forming a lower funnel 23 and having an aperture or the like forming a lower hopper outlet 25 to allow granular material 13 to pass therethrough.

The apparatus 11 includes a wiper plate 27 positioned between the upper hopper 15 and the lower hopper 21. The wiper plate 27 has an aperture or the like forming a wiper plate outlet 29 to allow granular material 13 to pass therethrough from the upper hopper outlet 19, and has a lower face surface 31 with a planar portion 32 surrounding at least the wiper plate outlet 29.

The apparatus 11 includes an impeller 33 mounted beneath the wiper plate outlet 29 and rotatably movable between a first position and a second position. The impeller 33 has at least a spaced pair of fins 35 forming a pocket 37 therebetween to receive a quantity of granular material 13 from the wiper plate outlet 29 when the impeller 33 is in the first position and to transfer the quantity of granular material 13 to the lower hopper 21 to be dispensed through the lower hopper outlet 25 when the impeller 33 is subsequently rotated to the second position. The impeller 33 preferably includes four spaced fins 35 forming four pockets 37 as clearly shown in FIGS. 3 and 6–9. Each of the fins 35 has a flexible distal end 39 to wipe against the planar portion 32 of the lower face surface 31 of the wiper plate 27 when the impeller 33 is rotated between the first and second positions.

The apparatus 11 preferably includes an outer housing 41 having a hollow interior 43 to receive the upper hopper 15, the lower hopper 21, the wiper plate 27, and the impeller 33. The outer housing 41 has an opened top 45 and an opened bottom 47. At least a portion of the outer housing 41 may be transparent to allow the amount of granular material 13 within the upper hopper 15 to be easily ascertained by merely looking at the apparatus 11, etc., as will now be apparent to those skilled in the art.

The apparatus 11 preferably includes an upper lid 49 removably attached to the opened top 45 of the outer housing 41, and a lower lid 51 removably attached to the opened bottom 47 of the outer housing 41. The lower lid 51 has an aperture or the like forming a lower lid outlet 52 to allow granular material 13 to pass therethrough.

The apparatus 11 preferably includes an upper gasket 53 positioned between the opened top 45 of the outer housing 41 and the upper lid 49 to allow a substantially air-tight seal to be formed therebetween.

The apparatus 11 preferably includes a lower gasket 55 positioned between the opened bottom 47 of the outer housing 41 and the lower lid 51 to allow a substantially air-tight seal to be formed therebetween.

The apparatus 11 preferably includes track means 57 for mounting a typical drip-type filter basket 59 or the like beneath the lower hopper outlet 25. The filter basket 59 is preferably designed to hold a typical drip-type coffee filter 60 or the like.

The apparatus 11 may include an inner housing 61 positioned within the hollow interior 43 of the outer housing 41 between the upper hopper 15 and the lower hopper 21 to house the fins 35 of the impeller 33. The inner housing 61 preferably has an opened top 63 communicating with the wiper plate outlet 29 to receive a quantity of granular material 13 therefrom. The inner housing 61 preferably has an opened bottom 65 communicating with the lower hopper 21 to allow the lower hopper 21 to receive a quantity of granular material 13 therefrom.

The actual construction, design, and operation of the apparatus 11 may vary considerably. The upper and lower lids 49, 51 may designed to be removably attached to the respective opened top and bottom 45, 47 of the outer housing 41 in any manner now apparent to those skilled in the art. For example, the top and bottom ends of the outer housing 41 may have external screw threads and the upper and lower lids 49, 51 may be designed with internal screw threads to screw onto the respective top and bottom ends of the outer housing 41. However, the upper and lower lids 49, 51 preferably each have a pair of opposed L-shaped slots 67 therein for coacting with a pair of opposed posts 69 extending from the top and bottom of the outer housing 41 to thereby allow the upper and lower lids 49, 51 to be manually attached to and removed from the respective opened top and bottom 45, 47 of the outer housing 41 by a pushand-twist or twist-and-pull motion, respectively, as will now be apparent to those skilled in the art. The impeller 33 preferably includes an elongated shaft 71 for extending through the outer housing 41 and inner housing 61, and for supporting the fins 35. The shaft 71 preferably has a first end 73 for being rotatably mounted to one side of the outer housing 41 and to which a handle or knob 75 can be attached from the exterior of the outer housing 41 to allow the shaft 71 to be manually rotated. The shaft 71 preferably has a second end 77 for being rotatably mounted to the other side of the outer housing 41. More specifically, a bushing 79 may be affixed to the outer housing 41 by, for example, being screwed to a threaded aperture 81 through the outer housing 41, and an end cap 83 may be affixed to the outer housing 41 by, for example, being screwed to an aperture 85 through the outer housing 41. The bushing 79 preferably has an aperture 87 therethrough for allowing the first end 73 of the shaft 71 or a portion of the knob 75 to extend therethrough. A ball-and-spring detent mechanism (not shown) is preferably provided between the bushing 79 and the shaft 71 or knob 75, etc., to allow positive 90° rotation of the shaft 71 as will now be apparent to those skilled in the art. The end cap 83 preferably has a cavity 89 therein for rotatably receiving the second end 77 of the shaft 71. The midportion of the shaft 71 may have grooves 91 therein extending lengthwise thereof and spaced substantially 90° apart from one another for securely receiving the proximal ends of the fins 35.

The upper funnel 17, lower funnel 23, wiper plate 27, outer housing 41, upper lid 49, lower lid 51, track means 57, inner housing 61, shaft 71, knob 75, bushing 79, and end cap 83 are preferably molded or otherwise constructed out of any well-known dishwasher-safe plastic. The upper funnel 17, lower funnel 23, wiper plate 27, outer housing 41, and inner housing 61 may be designed as separate, snap-together or glue-together components, etc., or may be designed with various parts thereof formed as integral, one-piece units for snapping or otherwise being joined to the other parts. For example, the upper funnel 17, wiper plate 27, and outer housing 41 may be formed as an integral, one-piece unit, and the lower funnel 23 and inner housing 61 may be formed as an integral, one-piece unit for snapping to the upper funnel 17, wiper plate 27, and outer housing 41 construct, etc. Likewise, the lower lid 51 and track means 57 are preferably formed as an integral, one-piece unit. The fins 35, upper gasket 49, and lower casket 55 may be molded or otherwise constructed out of a relatively soft, pliable rubber, etc.

While the size of the apparatus 11 may vary, one preferred size is designed so that the upper hopper 15 will hold a typical can of ground or instant coffee and each pocket 37 is designed to hold approximately one tablespoon of such coffee so that each 90° turn of the knob 75 will cause approximately one tablespoon of such coffee to be dispensed through the lower lid outlet 52 as will now be apparent to those skilled in the art. The air-tight seals formed by the gaskets 53, 55 will help maintain the freshness of the granular material 13 held by the upper hopper 15, etc.

Although the present invention has been described and illustrated with respect to a preferred embodiment and a preferred use therefor, it is not to be so limited since modifications and changes can be made therein which are within the full intended scope of the invention.

I claim:

1. An apparatus to dispense granular material; said apparatus comprising:

(a) an upper hopper to hold a quantity of granular material; said upper hopper having an upper face forming a upper funnel and having an upper hopper outlet to allow granular material to pass therethrough;

(b) a lower hopper having an upper face forming a lower funnel and having a lower hopper outlet to allow granular material to pass therethrough;

(c) a wiper plate positioned between said upper hopper and said lower hopper; said wiper plate having a wiper plate outlet to allow granular material to pass therethrough from said upper hopper outlet, and having a lower face surface with a planar portion surrounding said wiper plate outlet; and (d) an impeller mounted beneath said wiper plate outlet and rotatably movable between a first position and a second position; said impeller including at least a spaced pair of fins forming a pocket therebetween to receive a quantity of granular material from said wiper plate outlet when said impeller is in said first position and to transfer said quantity of granular material to said lower hopper to be dispensed through said lower hopper outlet when said impeller is subsequently rotated to said second position; each of said fins having a flexible distal end to wipe against said planar portion of said lower face surface of said wiper plate when said impeller is rotated between said first and second positions.

2. The apparatus of claim I in which is included an outer housing having a hollow interior to receive said upper hopper, said lower hopper, said wiper plate, and said impeller.

3. The apparatus of claim 2 in which said outer housing has an opened top and an opened bottom; in which is included an upper lid removably attached to said opened top of said outer housing; and in which is included a lower lid removably attached to said opened bottom of said outer housing.

4. The apparatus of claim 3 in which is included an upper gasket positioned between said opened top of said outer housing and said upper lid to allow a substantially air-tight seal to be formed therebetween; and in which is included a lower gasket positioned between said opened bottom of said outer housing and said lower lid to allow a substantially air-tight seal to be formed therebetween.

5. The apparatus of claim 1 in which said apparatus is used in combination with a filter basket, and in which said apparatus includes track means for mounting said filter basket beneath said lower hopper outlet.

6. The apparatus of claim 2 in which is included an inner housing positioned within said hollow interior of said outer housing between said upper hopper and said lower hopper to house said fins of said impeller.

7. The apparatus of claim 6 in which said inner housing has an opened top communicating with said wiper plate outlet to receive a quantity of granular material therefrom; and in which said inner housing has an opened bottom communicating with said lower hopper to allow said lower hopper to receive a quantity of granular material therefrom.

\* \* \* \* \*